United States Patent [19]

Vollmer

[11] Patent Number: 4,884,652

[45] Date of Patent: Dec. 5, 1989

[54] APPARATUS FOR USING THE IMPACT ENERGY OF A VEHICLE FOR A SAFETY DEVICE FOR THE PROTECTION OF PASSENGERS

[75] Inventor: Elmar Vollmer, Wettstetten, Fed. Rep. of Germany

[73] Assignee: Audi AG, Ingolstadt, Fed. Rep. of Germany

[21] Appl. No.: 749,532

[22] PCT Filed: Oct. 12, 1984

[86] PCT No.: PCT/DE84/00213

§ 371 Date: Aug. 8, 1985

§ 102(e) Date: Aug. 8, 1985

[87] PCT Pub. No.: WO85/01707

PCT Pub. Date: Apr. 25, 1985

[30] Foreign Application Priority Data

Oct. 13, 1983 [DE] Fed. Rep. of Germany ....... 3337232

[51] Int. Cl.<sup>4</sup> .................. B60K 28/14; B62D 1/18; B60R 22/20
[52] U.S. Cl. .................. 180/274; 280/806; 280/777; 297/313
[58] Field of Search .............. 280/748, 806, 807; 180/268, 269, 274, 282; 242/107, 4 A

[56] References Cited

U.S. PATENT DOCUMENTS

| | | | |
|---|---|---|---|
| 2,900,036 | 8/1959 | Blake | 180/82 |
| 3,423,124 | 1/1969 | Hewitt | 296/65 |
| 3,464,284 | 9/1969 | Fergle | 74/492 |
| 3,589,466 | 6/1971 | Dudley | 180/82 |
| 3,627,345 | 12/1971 | Le Mire | 280/87 |
| 3,871,470 | 3/1975 | Schwanz et al. | 280/806 |
| 3,929,203 | 12/1975 | Nagazumi | 180/232 |
| 4,411,334 | 10/1983 | Schlanger | 280/777 |
| 4,423,846 | 1/1984 | Föhl | 280/806 |
| 4,508,287 | 4/1985 | Nilsson | 280/806 |

FOREIGN PATENT DOCUMENTS

| | | |
|---|---|---|
| 1655597 | 7/1970 | Fed. Rep. of Germany . |
| 1630477 | 8/1971 | Fed. Rep. of Germany . |
| 2120174 | 11/1972 | Fed. Rep. of Germany . |
| 2159265 | 6/1973 | Fed. Rep. of Germany . |
| 2216378 | 10/1973 | Fed. Rep. of Germany . |
| 2246077 | 3/1974 | Fed. Rep. of Germany . |
| 2330950 | 1/1975 | Fed. Rep. of Germany . |
| 2548022 | 5/1976 | Fed. Rep. of Germany . |
| 2809664 | 9/1979 | Fed. Rep. of Germany . |
| 3327970 | 2/1985 | Fed. Rep. of Germany ... 242/107.4 A |
| 1012718 | 7/1952 | France . |
| 1258697 | 3/1961 | France ................ 280/806 |
| 1594234 | 7/1970 | France . |
| 2219867 | 9/1974 | France . |
| 2237452 | 2/1975 | France . |
| 2241968 | 3/1975 | France . |
| 2289367 | 5/1976 | France . |
| 2324321 | 4/1977 | France . |
| 2370601 | 6/1978 | France . |
| 1528908 | 10/1978 | United Kingdom . |

Primary Examiner—Charles A. Marmor
Assistant Examiner—Karin Tyson
Attorney, Agent, or Firm—Karl Hormann

[57] ABSTRACT

An apparatus responsive to the energy generated by a collision of predetermined force and relative movement between its chassis and drive unit resulting therefrom for actuating a safety mechanism, e.g. for tightening a seat belt.

6 Claims, 3 Drawing Sheets

APPARATUS FOR USING THE IMPACT ENERGY OF A VEHICLE FOR A SAFETY DEVICE FOR THE PROTECTION OF PASSENGERS

This application is related to Application Ser. No.: 745,770, filed June 13, 1985.

The invention relates to an apparatus utilizing the impact energy of a vehicle generated in a frontal collision, to actuate a safety device for the protection of passengers within the vehicle.

More particularly, the invention relates to a novel apparatus for tightening a seatbelt in response to relative movement between predetermined components of an automotive vehicle, such as, for instance, the displacement of the engine and transmission unit relative to the chassis as is common in front-end collisions exceeding a predetermined force.

Conventional safety devices for the protection of passengers within a vehicle during a collision are either located in a predetermined position (for instance, seat belts or a so-called knee catcher) or they are moved to their effective position during a collision, as is the case, for instance, with air bags or seat belt tensioning devices. These latter kinds of known safety devices always require a sensor which reacts to the deceleration occurring at a collision for releasing the safety device. Such sensors are subject to faulty releases and are expensive to manufacture, the latter being particularly true of the means (mostly of a pyrotechnical kind) for moving the safety devices into their effective position.

The present invention is based upon the task of providing an apparatus of the kind under consideration in such a way that the safety device may be released with the greatest possible reliability, without a sensor, and that it may be moved into its effective position by structurally simple means.

The task is accomplished in that relative movement occurring during a collision exceeding a predetermined magnitude, between an aggregate, such as, for instance, the engine and transmission, arranged in a frontal portion of the vehicle and a section of the chassis of the vehicle, is transferred to the safety device by a mechanism, whereby the safety device is moved into its effective position.

By exploiting, in accordance with the invention, this relative movement for the purpose of actuating a safety device sensors of any kind may be avoided and yet an improved release of the safety device is assured. The impact of the collision releases energy which is in any case sufficient to move the safety device into its effective position. In this connection, it is of particular advantage that the energy available, or the stroke of movement resulting, from a collision, is dependent upon the intensity of the impact. Since sufficient energy is available, no difficulty arises in providing for an enlarged stroke of movement for the safety device, by selecting an appropriate mechanical advantage at a short displacement stroke, or in limiting the available energy in a defined manner by means for limiting the force and/or stroke.

The relative movement may be transferred to the safety device in various ways. Depending upon structural conditions and the desired purpose, transfer of the relative movement may be accomplished mechanically, hydraulically or pneumatically. In the case of mechanical transfer, a mechanical advantage or a change in the direction of movement may be obtained by a lever or, where a cable is used by deflecting it repeatedly. In the case of a hydraulic or pneumatic transfer, a mechanical advantage may be obtained in the simplest possible manner by coordinating the diameter of a donor cylinder with the diameter of a receiving or slave cylinder. The conduit connecting the two cylinders permits great freedom in its installation, in contrast to mechanical transfer mechanisms.

The device in accordance with the invention is most effective in a frontal collision. The relative movement utilized for the safety device is generated when in this kind of collision an aggregate (e.g. engine, transmission) arranged in a frontal part of the vehicle engages the impediment during the collision whereupon the front part of the chassis moves over the aggregate.

It is particularly advantageous if the mechanism removes the steering wheel of the vehicle from the area of potential head impact of the driver of the vehicle. In this manner the cause of a potential injury is eliminated as compared to attempts at reducing the consequences of a possible head impact by such means as an impact plate mounted on the steering wheel.

Removal of the steering wheel or of the steering column may be accomplished in a simple manner by connecting one end of a cable to the aggregate and the other end to structure connected to the steering wheel and by providing between these ends a deflection means so that at a displacement of the aggregate relative to the chassis of the vehicle the steering wheel is pulled towards the dashboard of the vehicle.

It is advantageous if the mechanism raises the forward edge of one or more seats in the vehicle, thus yielding improved protection in connection with a seat belt (prevention or reduction of the so-called "submarining effect").

Advantageously, this mechanism may comprise a support element provided in the seat of the vehicle for transferring relative displacement to the forward edge of the seat by mechanical, hydraulic or pneumatic means. Such pneumatic means may comprise an air bag provided in the area of the forward edge of the seat of the vehicle and communicating, by a conduit, with a pneumatic cylinder the piston rod of which is connected to the aggregate. Of course, it is also possible not only to lift the forward edge but to lift the front of the entire seat (tilting).

It is of particular advantage if in case of a collision the mechanism tightens the seat belt. Such tightening for eliminating any slack in the seat belt may be accomplished by a cable connected to the aggregate by way of a deflecting means, effecting the seat belt by means of a clamping device.

Instead of engaging the seat belt directly the cable may act upon a pulley mounted on the shaft of the belt coiling device. Whereas in prior art seat belt tightening devices the cable is pulled off the pulley by a piston moved by an explosive charge, the cable in accordance with the invention, preferably comprising a Bowden wire, is guided to an aggregate arranged in a front part of the vehicle and connected thereto. Thus, a complicated explosive charge as well as a sensor may be avoided.

In connection with a seat belt tightening device as well as with mandatory safety devices it is advantageous to provide means for limiting the stroke or energy transferred. In a mechanical transfer mechanism this may accomplished, for instance, by sections of reduced strength in the transfer means (unlatching at a predetermined energy or stroke) or by an appropriate valve in the conduit of hydraulic or pneumatic transfer means.

A plurality of embodiments of the invention are depicted in the drawings and will be described in detail hereafter.

Figure 1:
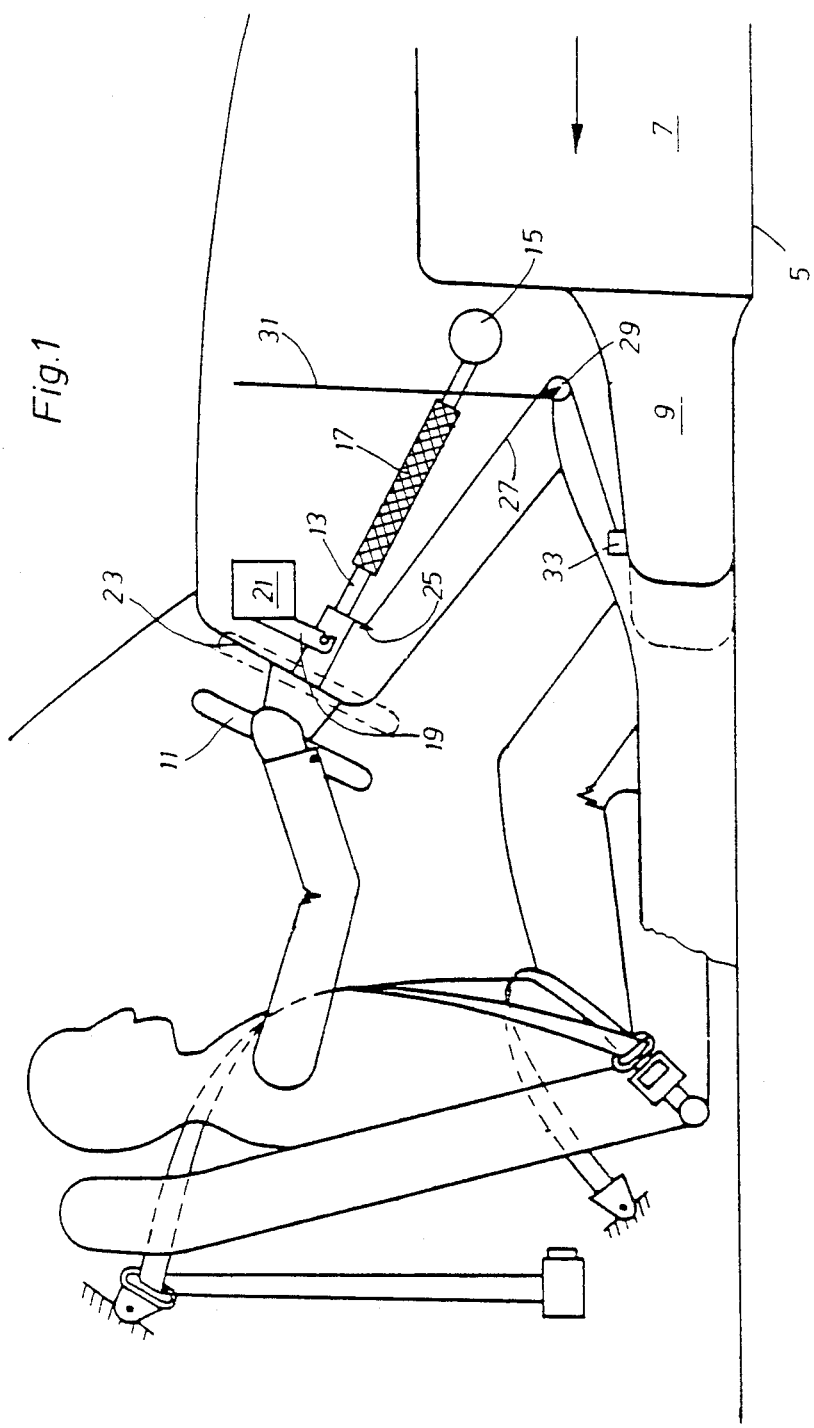
FIG. 1 is a schematic presentation of a safety device for removing the steering wheel of a vehicle.

FIG. 1 schematically depicts the forward compartment of a passenger automobile. An aggregate 5 is provided within the forward portion of the passenger automobile and comprises an engine 7 and a transmission 9.

A steering wheel 11 is provided for steering the automobile, the steering wheel 11 being connected to a steering transmission 15 by way of a steering column 13. The steering column 13 is provided with a grid-like section 17 which when impacted by a force of predetermined magnitude permits an axial displacement as well as a lateral braking away of the steering wheel 13. A releasable bracket 19 is provided for connecting the steering column 13 to a cross bar 21 which extends substantially across the entire width of the passenger automobile, behind a dashboard 23.

A cable 27 is connected to the steering column 13 at 25. The cable 27 extends around a pulley 29 near a fire wall 31 to a connection 33.

In case of a frontal collision the relatively rigid aggregate 5 will come into engagement the impediment even after only a small displacement of those parts of the chassis mounted forwardly of the aggregate 5. The remaining chassis continues to move; that is to say it is pushed over the aggregate 5. This results in relative movement (shown in dashed lines) between the aggregate 5 and the remainder of the chassis.

This relative movement is transferred in an opposite direction to the steering column 13 by means of the cable 27. Thus, the cable 27 pulls the steering column 13 towards the front of the vehicle in dependency of the intensity of the impact. In this manner the steering wheel 11 connected to the steering column 13 is removed from an area of potential impact of the head of the driver of the vehicle and into the dashboard 23.

Figure 2:
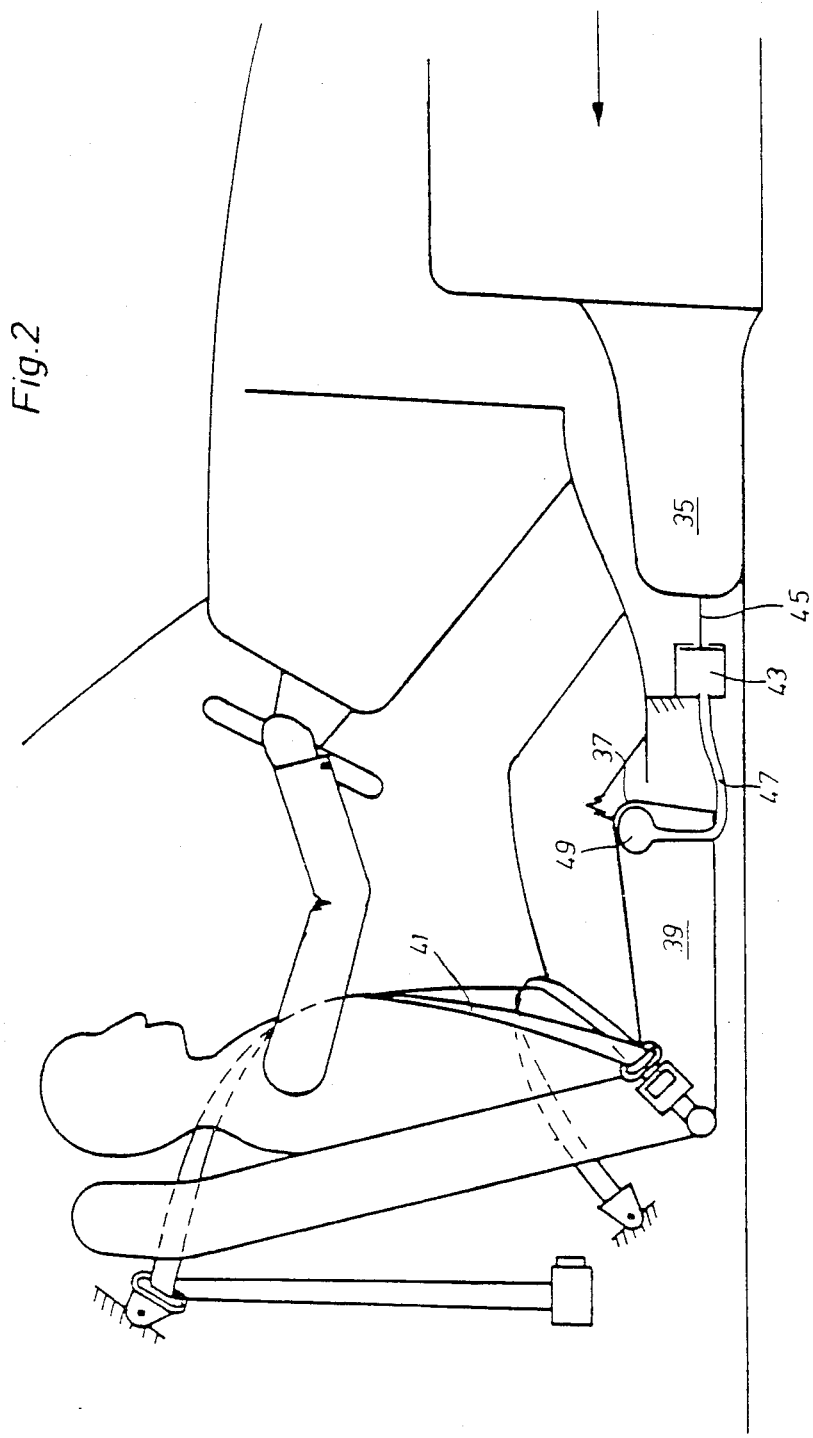
FIG. 2 depicts a safety device for lifting the forward edge of the seat of a vehicle.

FIG. 2 depicts the same section of the forward vehicle portion as FIG. 1. In this embodiment, relative movement between a transmission 35 and the chassis of the vehicle occurring in a frontal collision is utilized to lift the forward edge 37 of a forward seat 39 in order better to protect the person seated thereon and secured by a seat belt 41.

As may be seen in FIG. 2 the safety device comprises a pneumatic cylinder 43 connected to the chassis. The piston rod 45 of the cylinder 43 is connected to the transmission 35. In case of a frontal collision pressure is generated within the cylinder 43 on account of the relative movement, as described supra, between the transmission 35 and the chassis of the vehicle. The pressure is fed to an air bag 49 by way of a conduit 47. Thus the air bag 49 embedded in the front seat 39 is inflated and causes a lifting of the forward edge 37 of the seat.

Figure 3:
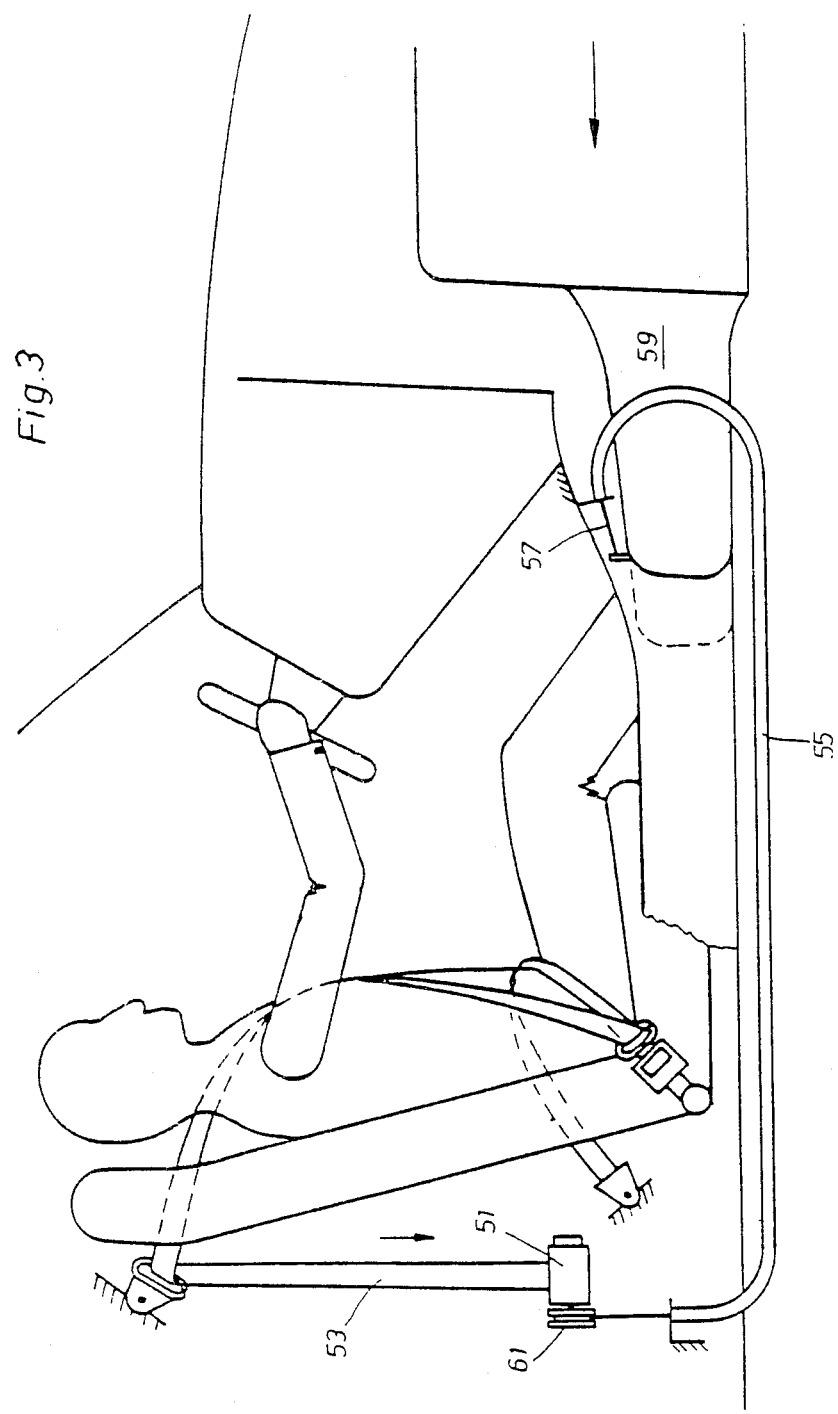
FIG. 3 shows a safety device for tightening a seat belt in case of a collision.

Finally, FIG. 3 depicts a device for tightening a seat belt 53 which may be partially stored upon a coiling device 51. For tightening the seat belt 53 a Bowden wire 55 is provided the ends of which are connected to the chassis of the vehicle. One end of a cable 57 extending through the Bowden wire sleeve 55 is connected to a transmission 59 housed in a forward section of the vehicle; the other end is partially coiled upon a pulley 61. The pulley 61 is directly mounted on the shaft of the coiling device 51.

The manner in which the Bowden wire 55 is connected results in the cable 57 being pulled off the pulley 61 in the direction in which the seat belt is wound. In this manner any slack in the seat belt is eliminated and a partial tightening of the seat belt becomes possible.

I claim:

1. An apparatus for enhancing the safety of a passenger in a vehicle of the kind having a chassis and drive means mounted in a forward section thereof for movement, when in a frontal collision of predetermined force, in a rearward direction relative to said chassis, comprising:
    a seat belt for retaining said passenger in a predetermined position and having a first portion extending generally forwardly of said passenger and a second portion extending generally rearwardly of said passenger;
    means for securing said first portion of said seat belt to said chassis rearward of said forward section thereof;
    retaining means for yieldably extending and retracting said second portion of said seat belt;
    flexible substantially unstretchable means having a first section connected to said drive means and a second section connected to said retaining means for selectively retracting said second portion of said seat belt; and
    means cooperating with said flexible means for converting said movement of said drive means in said rearward direction into a force whereby said second portion of said seat belt is retracted on said retaining means.

2. The apparatus of claim 1, wherein said flexible means comprises a cable.

3. The apparatus of claim 2, wherein said converting means comprises a longitudinally substantially incompressible sleeve over said cable and having end portions respectively connected to said chassis.

4. The apparatus of claim 2, wherein said converting means comprises a pulley and said cable is wound around said pulley to move said second section in a direction opposite from said first section.

5. The apparatus of claim 2, wherein said retaining means comprises a coiling means.

6. The apparatus of claim 5, further comprising means for limiting the extent of retraction of said second portion of said seat belt by said second section of said cable.

* * * * *